(12) United States Patent
Cohen et al.

(10) Patent No.: US 8,271,732 B2
(45) Date of Patent: Sep. 18, 2012

(54) SYSTEM AND METHOD TO REDUCE POWER CONSUMPTION BY PARTIALLY DISABLING CACHE MEMORY

(75) Inventors: Ehud Cohen, Motskin (IL); Oleg Margulis, Haifa (IL); Raanan Sade, Kibutz Gvat (IL); Stanislav Shwartsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 12/315,532

(22) Filed: Dec. 4, 2008

(65) Prior Publication Data

US 2010/0146212 A1 Jun. 10, 2010

(51) Int. Cl.
*G06F 12/08* (2006.01)

(52) U.S. Cl. .......... 711/128; 711/E12.017; 711/E12.018

(58) Field of Classification Search .................. 711/128, 711/122, E12.017, E12.018
See application file for complete search history.

(56) References Cited

U.S. PATENT DOCUMENTS

| | | | |
|---|---|---|---|
| 5,809,562 A * | 9/1998 | Gaskins et al. | 711/207 |
| 2006/0143382 A1 | 6/2006 | Damaraju et al. | 711/118 |
| 2007/0028051 A1 * | 2/2007 | Williamson et al. | 711/128 |
| 2008/0082753 A1 * | 4/2008 | Licht et al. | 711/128 |

* cited by examiner

*Primary Examiner* — Yong Choe
(74) *Attorney, Agent, or Firm* — Trop, Pruner & Hu, P.C.

(57) ABSTRACT

In one embodiment, a cache memory includes a data array having N ways and M sets and at least one fill buffer coupled to the data array, where the data array is segmented into multiple array portions such that only one of the portions is to be accessed to seek data for a memory request if the memory request is predicted to hit in the data array. Other embodiments are described and claimed.

20 Claims, 4 Drawing Sheets

SYSTEM AND METHOD TO REDUCE POWER CONSUMPTION BY PARTIALLY DISABLING CACHE MEMORY

BACKGROUND

Caches are very common structures in modern processors. The main functionality of a cache is to hold recently used copies of data, e.g., lines from main memory. These lines are likely to be used by the processor and therefore are available within few clocks, which is referred to as the level 1 (L1) cache access time latency. A L1 cache is generally a lowest level cache, and is typically formed on the same semiconductor die as a core of the processor. Caches stores copy of lines of the main memory with a line size that is often 64 bytes in modern processors A non-blocking cache is the most common cache structure and is used in an out-of-order micro-architecture. In this structure the cache is not blocked when handling a L1 cache miss so that it can serve latter requests (loads and stores). This behavior is accomplished using dedicated hardware that is called a fill buffer (FB). Typically, multiple individual fill buffers will be present, one of its tasks is to store a line received from the main memory before it is inserted in the cache. A fill buffer may contain a copy of a line in any state (the same way a data cache keeps lines). Generally fill buffers are considered an extension to a data cache. In this case the fill buffers are accessed whenever the data cache is accessed A cache structure is also characterized by its size and set-associativity. A size of a cache is often expressed as the number of bytes that can be stored. Set-associativity of the cache is the partitioning the cache between sets and ways. For example, a 32K byte, 8-way set associative cache having a 64 byte line size structure includes 64 sets, and for each set there are 8 ways (e.g., lines or entries) of 64 bytes each.

Typically, a L1 cache is the first level data cache that is accessed by load and store operations from a processor. With the lack of general-purpose registers in an x86 architecture, L1 cache activity is high. Therefore loads and stores that access the L1 cache are frequent. Cache size and its associativity can affect performance. Any load accessing the cache will read all ways of a set before determining from which way to obtain the data. For example, all N ways are accessed in parallel (timing) on each access. In addition, fill buffers (which are an extension to the cache) are also accessed on every memory access.

DETAILED DESCRIPTION

In various embodiments, a cache architecture can be configured to conserve power. In some implementations, certain data-arrays and tag arrays of the cache memory can be split into at least two segments such that only a partial number of ways of these arrays are accessed on every memory access. For example, in an implementation having an 8 way arrangement, the data and tag arrays can be split into two such segments (e.g., each of 4 ways) so that for each access only the ways of a given segment are accessed. In this way, power consumption may be reduced. As will be described further below, the selection of which group of ways to access may be based on at least a portion of an address associated with the memory access request, e.g., a given bit of a linear address. To reduce power consumption even further, in some implementations fill buffers can be blocked and not accessed when it is predicted that an access will be served from the data cache. While the scope of the present invention is not limited in this regard, such prediction may be based on a history of recent data accesses that hit within the cache memory.

A given architecture and its paging dictate cache structure and size. As one example, only certain linear address (LA) bits, e.g., LA bits [11:0] of a memory request do not go through translation to a physical address (PA). As such, at least some of the bits can be used as a set address to access the cache. In one embodiment, with a 64 byte line size, linear address bits [11:6] can be used as set address (and therefore to select from 64 sets). With the above limitation, one can understand that L1 cache size can be increased by increasing its associativity. However, increasing cache associativity consumes more power, as all ways are accessed in parallel, although only one way is needed to complete the access.

Reducing the number ways of a cache structure will reduce power consumption. There are several options to implement reduced ways of a cache. These may include reducing the size of the cache by cutting the number of ways. However, this can result in a performance loss and glass jaws. Or keep the cache size the same and reduce the number of ways of the data array and tag array accessed on every access (i.e., increase number of sets). Although this may maintain performance while reducing power of both tag and data arrays, additional complexity may occur as a result of possible aliasing. Thus in another embodiment, a partial way implementation may be realized in which partial access of the ways of a data array is performed, while generally still accessing all ways of the tag array. This option compromises power saving versus complexity, with no performance loss.

Figure 1:
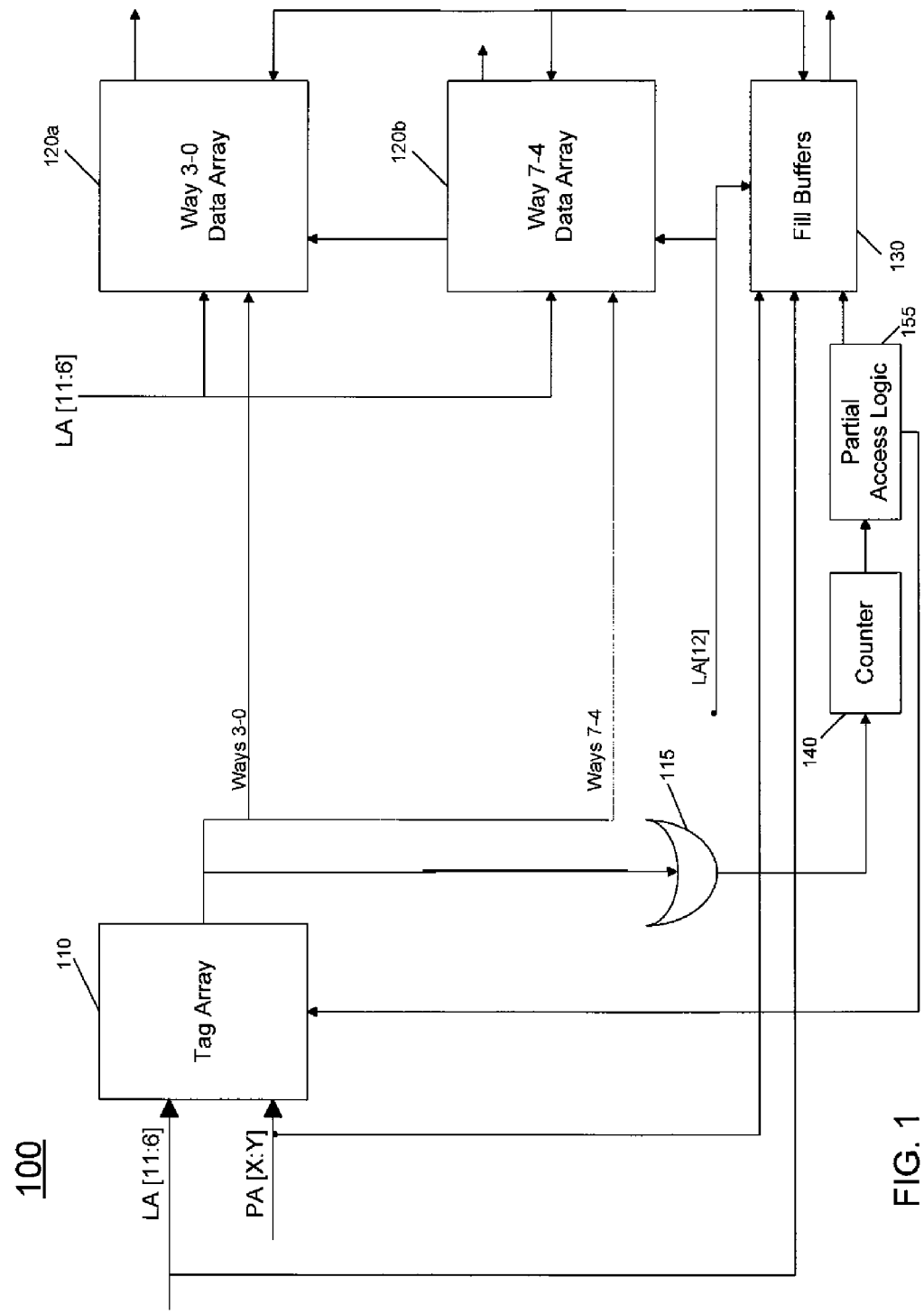
FIG. 1 is a block diagram of a cache memory in accordance with an embodiment of the present invention.

Referring now to FIG. 1, shown is a block diagram of a cache memory in accordance with an embodiment of the present invention. As shown in FIG. 1, memory 100 includes a tag array 110 and a data array 120. In the implementation of FIG. 1, data array 120 is split into a first way portion $120_a$ and a second way portion $120_b$. In some embodiments tag array 110 may be similarly split. By splitting such arrays into multiple portions, only a selected portion can be accessed for a given memory access, thus reducing power consumption. More specifically, as shown in FIG. 1, a given portion of the memory access request address, namely a linear address bit [12] is used to select which way portion to access.

In the embodiment of FIG. 1, tag array 110 may be addressed using a portion of the linear address, namely LA bits [11:6] to thus identify a given set. Then a comparison is made between a portion of a physical address (PA), which may be obtained from a translation buffer such as a translation lookaside buffer (TLB). In the embodiment shown in FIG. 1, PA bits [X:Y] may be compared to, e.g., a tag or address field of each way present in the selected set to determine if a match occurs. If so, tag array 110 outputs a way selection vector. Way selection vector may be, in one embodiment, an 8-bit vector with two portions, i.e., high order and low order bits of the way selection vector. Each portion is provided to one of data arrays 120. Based on linear address bit 12, a given way of the selected data array 120 may be accessed to determine whether a hit occurs. In one embodiment only one of data arrays 120 is accessed based on linear address bit [12], LA[12]. Namely, ways 3-0 are accessed when LA[12]=0 and ways 7-4 are accessed when LA[12]=1. As shown, the selected four bits of the way select vector from tag array 120 are sent to the two halves of data array 120. Note that one of data arrays 120a and 120b is thus powered off due to LA[12].

Tag array 110 is used to keep address information and state of lines. Each entry or way of tag array 110 may include various fields including a state field, tag field, and a data field, which may store the way selection vector. On every access, tag array 110 may, via comparators, compare (in parallel) all ways to determine whether a line can be read from data array 120. In one embodiment, tag array 110 uses PA from translation buffer for the comparison (with the PA cached in its tag field). As will be described below, the use of LA[12], which is known early in time, i.e., the same time set address bits [11:16] are known, to select which 4 ways of tag array 110 are matched, may need special attention. That is, since this indication does not goes through translation and since the x86 architecture allows aliasing of different linear addresses into the same physical address, it is possible that the indication is incorrect, as the line may exist in the cache but LA[12] indicates the wrong way (e.g., a false hit).

The following are all cases of hit/miss in a cache in accordance with an embodiment of the present invention. First, a hit may occur in the four ways indicated by LA[12], in this case the access is satisfied and corresponds to a true hit. Second, a miss may occur in all 8 ways, in this case a fill buffer entry is allocated and a miss handling process is started, thus this case corresponds to a true miss. In the final case, a hit may occur in the four ways not indicated by LA[12] (which occurs as a result of aliasing). In this case, tag array 110 indicates a hit, but the incorrect four ways of data array 120 are accessed. This case thus corresponds to a false hit. In this case, recovery can occur by recycling the access (load or store) and accessing all ways of data arrays $120_a$ and $120_b$ on the recycled access.

To ensure linear address bit [12] (LA[12]) correctly indicates which 4 ways should be used, a replacement policy into cache 100 may consider the value of this bit. If LA[12]=0, the line will be replaced into data array 120a, and if LA[12]=1, the line will be replaced into data array 120b.

Figure 2:
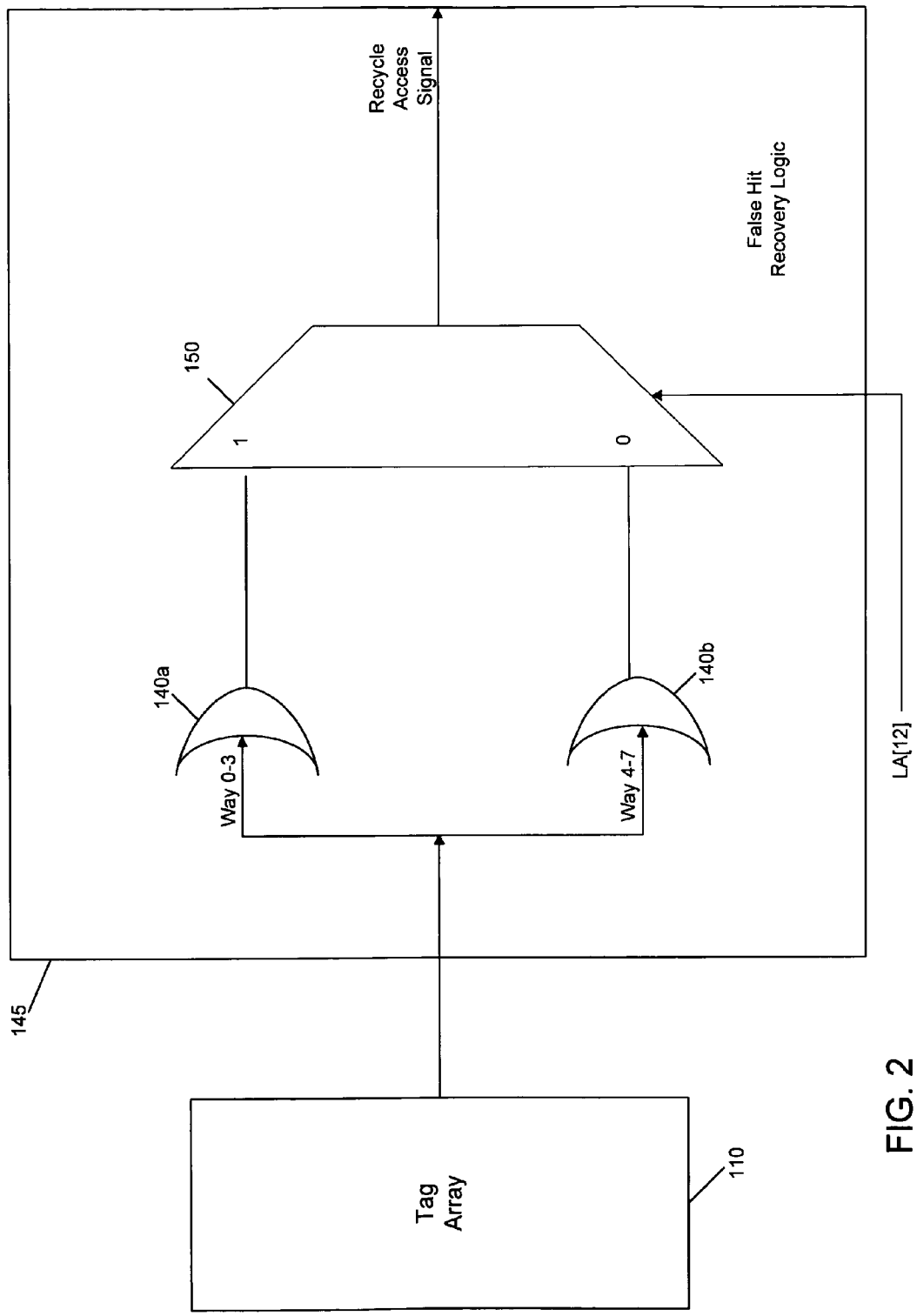
FIG. 2 is a block diagram of false hit recovery logic in accordance with an embodiment of the present invention.

As explained above, a false hit occurs where the line is in the cache memory 100, however the data array selected is incorrect, based on aliasing in LA[12], and therefore requested data cannot be supplied. Referring now to FIG. 2, shown is a block diagram of a false hit recovery logic 145 in accordance with an embodiment of the present invention. As shown in FIG. 2, logic 145 may be used to handle the false hit occurrence. In various implementations, logic 145 may be part of cache memory 100, e.g., as part of a cache controller or other such logic. The inputs to logic 145 may include the way select vector, obtained from tag array 110, in addition to the LA bit 12. As seen, logic 145 may include various logic gates to receive these values and process them to generate a control signal, namely a recycle access signal, which can be provided to a requesting core or other logic, e.g. of a cache controller, to cause a signal to be sent to regenerate the memory access request. Thus in some embodiments, the recycle access signal may be provided to a separate logic to indicate back to the core that the memory operation did not complete. Such logic may further enable the recycled access and more specifically cause that access to access all ways of the data array. However during this (re-generated) memory access operation, all ways of the data array may be enabled so that the proper hit value can be obtained. As seen in FIG. 2, logic 145 includes a first pair of logic gates $140_a$-$140_b$, which may be OR gates, each to receive respective upper and lower portions of the way select vector. The outputs may be provided to a second logic 150, which may be a multiplexer with LA[12] as its control. The output of logic 150 thus is the recycle access signal.

Using logic 145, in case LA[12]=0 and there is hit in ways 7-4 OR LA[12]=1 and there is hit in ways 3-0, the access is not completed and it is recycled by generation of the recycle access signal. In the next access (after recycling), the correct "way select" is selected. In the other cases, i.e., the "true hit" and "true miss", no special action such as via recovery logic 145 is needed.

Referring back to FIG. 1, fill buffers 130 can be considered as way extensions to the cache memory, where each fill buffer keeps an entire cache line. In various embodiments, fill buffers 130 each have their own comparator which compares an incoming physical address to see if it includes the data to be provided to the core. As such, the fill buffers act as both tag array and data array. In an embodiment including a number of fill buffers, e.g., 10 fill buffers, much power can be consumed during an access. Since a line can be located in a fill buffer or in the cache (but not in both), both structures are conventionally accessed simultaneously. Accessing the two structures in parallel provides the following: completing the access if data is in one of the structures (true hit) or starting miss handling process immediately in case of a miss (true miss). Thus in a pattern where there are many cache misses, requested address information may be sent to both tag array 110 and to fill buffers 130 to perform accesses in parallel. However, in a different portion of execution, a long access of hits in data array 130 occurs. In these instances, logic may prevent the addresses from being sent to fill buffers 130. In this way, the power consumption due to performing comparisons in fill buffers 130 can be avoided. In general, power consumption may be reduced by not sending address information to fill buffers 130, ensuring that no logic is toggled as no comparison is being done where a static design is used. In another implementation where a dynamic design is used other actions like clock gating may further be performed.

Since the fill buffer and data cache do not keep the same line simultaneously, only one of the structures can be accessed to complete the access. It has been observed that there are long periods of time where all loads and stores are hit in the data cache. In these periods of time, the fill buffer lookup is not needed as the line is present in the data cache. In various embodiments, these cases of long sequences of hits in the data cache are detected. Then the entire fill buffer logic can be blocked and no power is consumed by the fill buffer logic on memory accesses. The first miss on the data cache will cause next access to activate the fill buffers. Note that the first miss will also have a penalty in miss handling as a fill buffer (that is used to handle misses) will be allocated after recycle. However, the impact on performance is minimal since the fill buffers are blocked after a long sequence of hits in the data cache. In various embodiments, the sequence length parameter can be configurable and can be set to 128 clocks of hits in the data cache, in one embodiment. Thus in various embodiments, fill buffers 130 are blocked (not accessed) when it is predicted that the request will be served by data array 120 (therefore saving the power of accessing the fill buffers).

In a similar manner, tag array 110 may be controlled to access only four ways when a request is predicted to hit in the data array 120. This can be achieved by detecting a long sequence of requests that are served by the data cache, and which can be realized via the same conditions and mechanisms used to access fill buffers 130. Then, using LA[12], only partial tag array access may occur.

In one embodiment, a configurable counter 140 can be used to count the number of consecutive cycles in which accesses to data array 120 were a hit. The counter may be set to zero after reset or after an access that misses data array 120. The counter is incremented on every access that hits data array 120 (via a hit signal from an output of a logic gate 115 which may be an OR gate). The counter is saturated when a configurable number is reached, indicating that fill buffer 130 can be blocked (and a portion of tag array 110 may not be accessed). As shown in FIG. 1, in one embodiment, a partial access logic 155 may be coupled to counter 140 and may block access to fill buffers 130 and allow partial access to tag array 110 when the count value has reached a threshold level.

When counter 140 is saturated, all fill buffers are blocked (not accessed). The first miss while in long sequence mode will cause an exit from the long sequence mode. The access that misses data array 120 is marked for recycle (e.g., the same way access is recycled when there is a false hit) and counter 140 is reset on the next dispatch, and fill buffers 130 are accessed. There is a penalty on the access that missed the data cache and triggers the switch from long sequence mode. Miss process handling will start a few clocks later (the number of cycles it takes to recycle). Note that in some embodiments, other ways of blocking the fill buffer can be applied. For example, a dynamic counter threshold may be used for detecting a long sequence of hits instead of a static threshold, or predictions may be made, such as a linear instruction pointer (IP) based prediction or a stack operation prediction.

Figure 3:
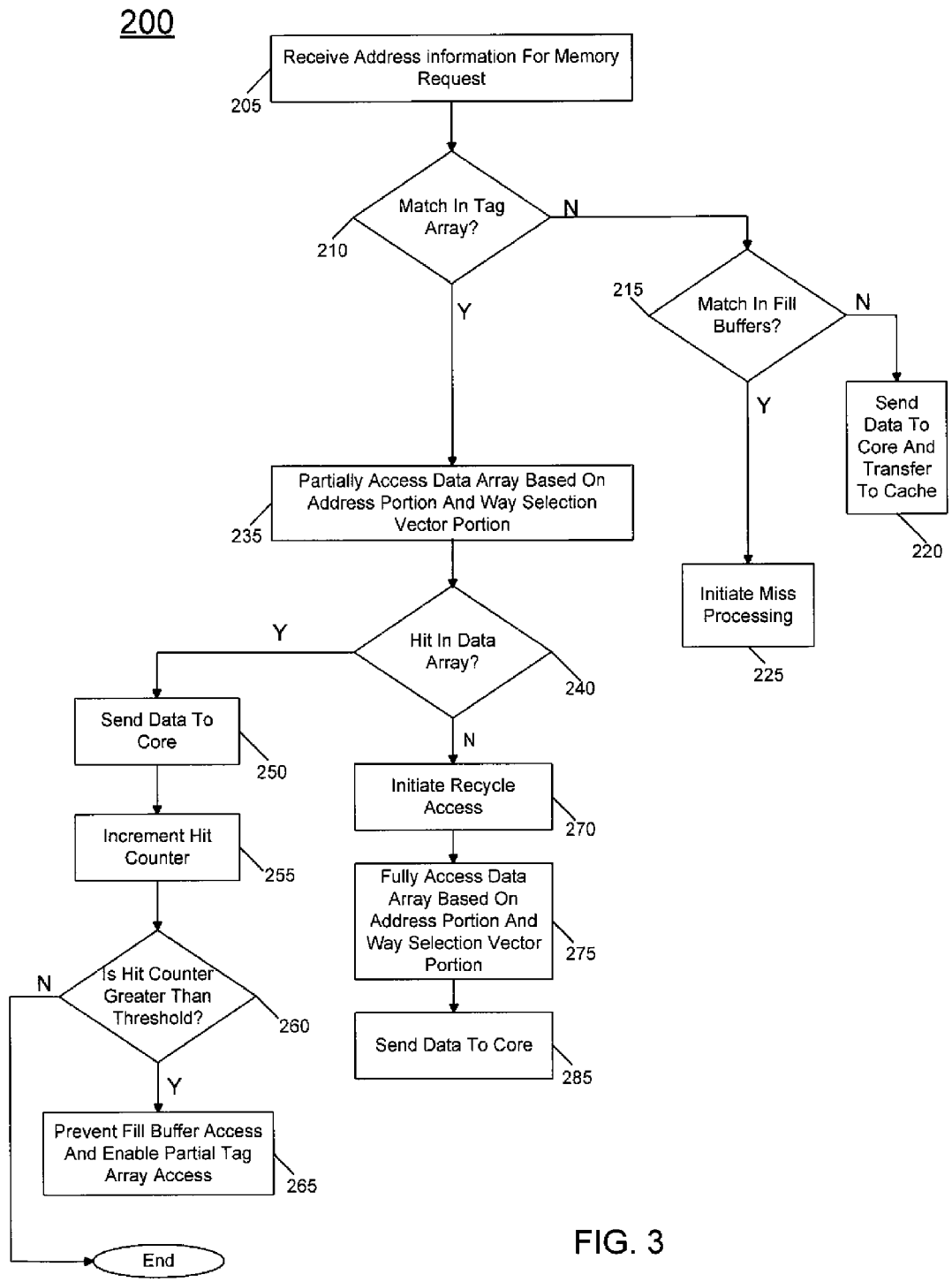
FIG. 3 is a flow diagram of a method in accordance with one embodiment of the present invention.

Referring now to FIG. 3, shown is a flow diagram of a method in accordance with one embodiment of the present invention. As shown in FIG. 3, method 200 may be used to reduce power consumption in a cache memory by enabling partial data (and tag) array access, as well as preventing access to fill buffers where possible. As shown in FIG. 3, method 200 may begin by receiving address information for a memory request (block 205). As discussed above, this address information may include parts of a linear address as well as at least parts of a physical address, which may be obtained directly from a processor core and a TLB, respectively. Next, at diamond 210 it may be determined whether a match occurs in the tag array. This may be determined based on a comparison of the physical address portion to the entries in the selected set of the tag array. If not, control passes to diamond 215 where it may be determined whether the same address information matches in the fill buffers. If so, the data may be sent to the requesting core and the data itself is also transferred to an entry in the cache (block 220). Otherwise if no hit occurs to the fill buffers, miss processing may be initiated by block 225.

Referring still to FIG. 3, if the address information matches in the tag array, the selected entry will be output. This entry corresponds to a way selection vector, a portion of which may be selected based on a portion of the address information such as a bit of the linear address. Then the data array, which may be a split data array, may be partially accessed based on the address portion and the selected way selection vector portion (block 235). Then it may be determined whether a hit occurs to the accessed portion (diamond 240). That is, if the linear address information is correct, a hit occurs and data present in the selected way of the data array may be sent to the core (block 250). In addition, a hit counter, which may include a count of consecutive hit accesses, may be incremented (block 255). Next it may be determined whether the hit counter is greater than a threshold (diamond 260). If so, access to the fill buffer may be prevented and partial tag array accesses may be enabled (block 265).

If instead, a false hit occurs because the linear address portion is not correct, control passes to block 270 where a recycle access may be initiated. After hitting in the tag array, the way selection vector output may be provided to the fully accessed data array (i.e., all N ways) such that the data may be output (block 275). Thus by fully accessing the data array, the requested data can be obtained and sent to the requested core (block 285). While shown with this particular implementation in the embodiment of FIG. 3, understand the scope of the present invention is not limited in this regard.

Figure 4:
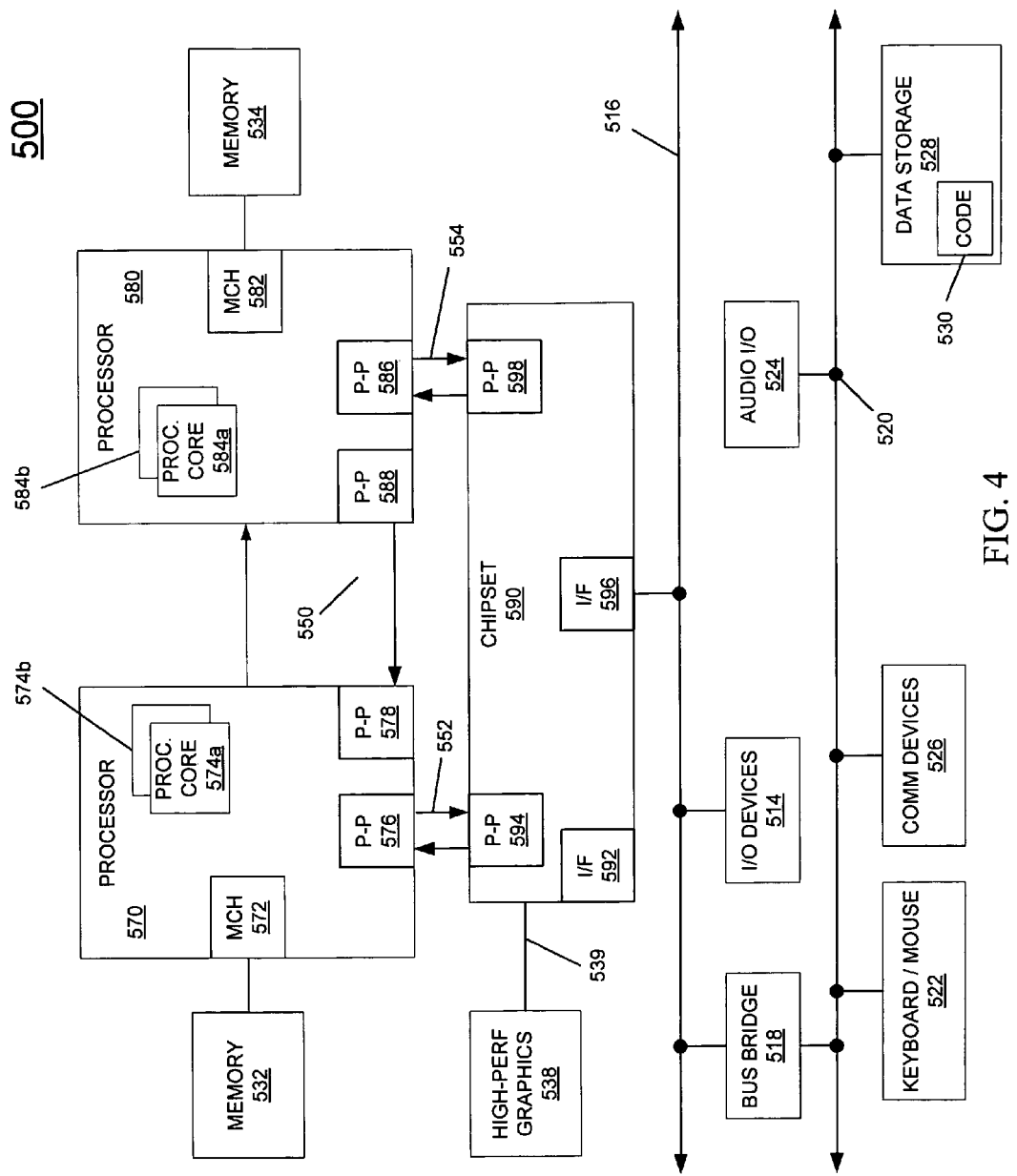
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). Each such processor may include a cache memory such as set forth in FIGS. 1 and 2 to enable partial cache accessing to reduce power consumption according to embodiments of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538 via an interconnect 539. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first data array including a first plurality of entries corresponding to a first group of ways for a plurality of sets;
a second data array including a second plurality of entries corresponding to a second group of ways for the plurality of sets; and
a tag array addressed using a first linear address portion corresponding to a memory request to identify a set, the tag array including a plurality of entries each to store a way vector to identify a way of the first data array or the second data array of the identified set to be selected and to output a first portion of the way vector to the first data array and to output a second portion of the way vector to the second data array, wherein only the first plurality of entries corresponding to the group of ways of the first data array or the second plurality of entries corresponding to the group of ways of the second data array is to be accessed based on a second linear address portion corresponding to the memory request.

2. The apparatus of claim 1, wherein only a portion of the tag array corresponding to the first data array is to be accessed during a memory request if the memory request is predicted to hit in the first data array.

3. The apparatus of claim 1, further comprising a counter to store a count of consecutive hit accesses to the first and second data arrays.

4. The apparatus of claim 1, further comprising a plurality of fill buffers coupled to the first and second data arrays, wherein the plurality of fill buffers are not to be accessed during the memory request if the memory request is predicted to hit in the first data array or the second data array.

5. The apparatus of claim 4, wherein the memory request is predicted to hit based on a value of a counter associated with consecutive hit accesses.

6. The apparatus of claim 5, further comprising logic to prevent access to the fill buffers if the value is greater than a threshold.

7. The apparatus of claim 6, wherein the logic is to enable partial access to the tag array if the value is greater than the threshold.

8. The apparatus of claim 1, further comprising recovery logic to generate a recycle signal if a false hit occurs such that the one of the first and second data arrays including requested data of the memory request is not accessed, based on the first linear address portion.

9. The apparatus of claim 8, wherein the first and second data arrays are to be accessed responsive to the recycle signal to obtain the requested data.

10. A method comprising:
selecting a portion of a way vector output from a tag array of a cache memory, addressed using a first linear address portion of a memory request from a processor to identify a set using a the first linear address portion of the memory request;
partially accessing a data array of the cache memory using a second linear address portion of the memory request and the selected way vector portion, the partial access corresponding to a first group of ways of the data array; and
providing data from one of the first group of ways to the processor if the data is present therein, otherwise initiating a recycle access to the cache memory to obtain the data.

11. The method of claim 10, further comprising incrementing a hit counter corresponding to a count of consecutive hit accesses if the data is present in the first data array.

12. The method of claim 11, further comprising preventing access to a fill buffer associated with the cache memory, if the hit counter is greater than a threshold.

13. The method of claim 10, further comprising receiving the way vector from the tag array responsive to a match between a physical address segment of the memory request and a tag field of the tag array.

14. The method of claim 10, wherein the recycle access causes the data array to be fully accessed such that the data may be provided to the processor.

15. A system comprising:
a processor to execute instructions;
a cache memory coupled to the processor, the cache memory including a data array having N ways and M sets and at least one fill buffer coupled to the data array, wherein the data array is segmented into at least a first array portion and a second array portion each including a portion of the N ways, wherein only the portion of the N ways of a first one of the first and second array portions including the portion of the N ways is to be accessed to seek data responsive to a first linear address portion of a memory request and access to the at least one fill buffer is to be prevented if the memory request is predicted to hit in the data array, wherein N is less than M, and N and M are not zero or negative; and
a dynamic random access memory (DRAM) coupled to the cache memory.

16. The system of claim 15, wherein the cache memory further includes a tag array including a plurality of entries each to store a way vector to identify a way of the first array portion or the second array portion to be selected.

17. The system of claim 16, wherein the first array portion is to receive a first portion of the way vector and the second array portion is to receive a second portion of the way vector.

18. The system of claim 15, further comprising partial access logic to prevent access to the at least one fill buffer during the memory request if the memory request is predicted to hit in the data array.

19. The system of claim 18, wherein the cache memory is to fully access the first array portion and the second array portion if a false hit occurs when the memory request is predicted to hit.

20. The system of claim 18, further comprising a counter to store a count of consecutive hit accesses to the first and second array portions, wherein the memory request is predicted to hit if the count is greater than a threshold.

* * * * *